US010168419B2

(12) United States Patent
Trummer

(10) Patent No.: US 10,168,419 B2
(45) Date of Patent: Jan. 1, 2019

(54) POLARIMETRIC RADAR FOR OBJECT CLASSIFICATION AND SUITABLE METHOD AND SUITABLE USE THEREFOR

(71) Applicant: ASTYX GmbH, Ottobrunn (DE)

(72) Inventor: Stefan Trummer, Strasslach-Dingharting (DE)

(73) Assignee: ASTYX GmbH, Ottobrunn (DE)

( * ) Notice: Subject to any disclaimer, the term of this patent is extended or adjusted under 35 U.S.C. 154(b) by 398 days.

(21) Appl. No.: 14/774,626

(22) PCT Filed: Mar. 11, 2014

(86) PCT No.: PCT/EP2014/054665
§ 371 (c)(1),
(2) Date: Sep. 10, 2015

(87) PCT Pub. No.: WO2014/139992
PCT Pub. Date: Sep. 18, 2014

(65) Prior Publication Data
US 2016/0025839 A1 Jan. 28, 2016

(30) Foreign Application Priority Data
Mar. 11, 2013 (DE) .................. 10 2013 102 424

(51) Int. Cl.
*G01S 13/93* (2006.01)
*G01S 7/02* (2006.01)
(Continued)

(52) U.S. Cl.
CPC ............... *G01S 7/026* (2013.01); *G01S 7/35* (2013.01); *G01S 7/41* (2013.01); *G01S 13/42* (2013.01);
(Continued)

(58) Field of Classification Search
CPC ............... G01S 7/35; G01S 7/41; G01S 7/026
(Continued)

(56) References Cited

U.S. PATENT DOCUMENTS 6,268,835 B1 * 7/2001 Toland ............... H01Q 1/08
343/781 P
6,351,237 B1 * 2/2002 Martek ............... H01Q 3/22
342/361

(Continued)

FOREIGN PATENT DOCUMENTS

CN 102053245 A 5/2011
EP 2 230 533 9/2010
(Continued)

OTHER PUBLICATIONS

State Intellectual Property Office of People's Republic China; Office Action dated Dec. 29, 2016 in corresponding Chinese Application No. 201480026781.X (Original Action in CN language: 9 pages; DE translation: 9 pages; English-language translation:2 pages).

(Continued)

*Primary Examiner* — Marcus E Windrich
(74) *Attorney, Agent, or Firm* — Fish & Richardson P.C.

(57) ABSTRACT

The present invention relates to a polarimetric radar, consisting of a transmission assembly that emits circularly polarized waves by means of transmission antennas and a receiver assembly that receives the reflected circularly polarized wave components by means of an antenna assembly. A plurality of two-channel receivers are provided as the receiver assembly, which simultaneously receive clockwise-rotating and anti-clockwise-rotating circularly polarized signal components, which are provided for digital beam shaping downstream of the antenna assembly. The invention further relates to a method for object classification.

22 Claims, 13 Drawing Sheets

(51) Int. Cl.
G01S 7/41 (2006.01)
G01S 13/42 (2006.01)
H01Q 1/32 (2006.01)
H01Q 3/26 (2006.01)
H01Q 13/02 (2006.01)
H01Q 13/06 (2006.01)
H01Q 15/24 (2006.01)
H01Q 21/06 (2006.01)
G01S 7/35 (2006.01)

(52) U.S. Cl.
CPC ......... *G01S 13/931* (2013.01); *H01Q 1/3233* (2013.01); *H01Q 3/2605* (2013.01); *H01Q 13/0266* (2013.01); *H01Q 13/065* (2013.01); *H01Q 15/244* (2013.01); *H01Q 21/064* (2013.01)

(58) Field of Classification Search
USPC .................................... 342/70–72, 109, 188
See application file for complete search history.

(56) References Cited

U.S. PATENT DOCUMENTS

| | | | |
|---|---|---|---|
| 6,507,323 | B1 | 1/2003 | West |
| 7,834,803 | B2* | 11/2010 | Weinstein ............... H01Q 19/19 342/149 |
| 2004/0178943 | A1 | 9/2004 | Niv |
| 2005/0195383 | A1* | 9/2005 | Breed ..................... B60N 2/002 356/4.01 |
| 2008/0100510 | A1 | 5/2008 | Bonthron et al. |
| 2008/0129594 | A1* | 6/2008 | Pera ..................... H01Q 9/0435 342/361 |
| 2009/0262011 | A1* | 10/2009 | Calderbank ............. G01S 7/024 342/188 |
| 2011/0102238 | A1 | 5/2011 | Kamo |
| 2012/0105268 | A1 | 5/2012 | Smits et al. |
| 2012/0274499 | A1* | 11/2012 | Chang ..................... G01S 7/42 342/107 |
| 2013/0162475 | A1* | 6/2013 | Blech ..................... H01Q 21/08 342/368 |
| 2013/0234904 | A1* | 9/2013 | Blech ..................... H01Q 13/06 343/776 |
| 2013/0278457 | A1 | 10/2013 | Kamo |
| 2016/0209506 | A1* | 7/2016 | Longstaff ................ G01S 7/024 |

FOREIGN PATENT DOCUMENTS

| | | |
|---|---|---|
| JP | H06-232621 | 8/1994 |
| JP | H07-84042 | 3/1995 |
| JP | 2000-049524 | 2/2000 |
| JP | 2000-088954 | 3/2000 |
| JP | 2003-179510 | 6/2003 |
| JP | 2006-311050 | 11/2006 |
| JP | 2009-074918 | 4/2009 |
| JP | 2010-085164 | 4/2010 |
| JP | 2010-217035 | 9/2010 |

OTHER PUBLICATIONS

Alexis Paolo Garcia Ariza et al., "60 GHz Polarimetric MIMO Sensing: Architectures and Technology" 6th EURO Mar. 30, 2012 (Mar. 30, 2012), pp. 2578-2585.

Guimei Zheng et al., "Angle and polarization estimation using ESPRIT with polarimetric MIMO radar", IET International Conference on Radar Systems (Radar 2012), Oct. 25, 2012, pp. 1-4.

International Search Report for corresponding International Patent Application No. PCT/EP2014/054665 dated Jul. 7, 2014.

Japanese Office Action in Japanese Application No. 2015-562085, dated Dec. 5, 2017, 9 pages (with English translation).

EPO Communication in European Application No. 14717677, dated Feb. 1, 2018, 9 pages.

Japanese Office Action in Japanese Application No. 2015-562085, dated Aug. 7, 2018, 7 pages (with English translation).

* cited by examiner

POLARIMETRIC RADAR FOR OBJECT CLASSIFICATION AND SUITABLE METHOD AND SUITABLE USE THEREFOR

The present invention relates to a polarimetric radar for object classification and to a suitable method and a suitable use therefore.

BACKGROUND

In order to reduce the number of road traffic accidents driver assistance systems are being used more and more. The currently integrated ACC (Adaptive Cruise Control) systems are comfort systems for automatic speed control which regulate speed depending on the distance and relative speed between one's own vehicle and the one in front. For future vehicles radar devices for drive assistance systems will no longer be categorised by vehicle manufacturers as comfort systems, but as systems that are critical to safety in order e.g. for the braking assistant to be able to execute full braking in order to avoid a collision because the driver has not applied the brake pedal or has done so too late. For this purpose the radar devices for driver assistance systems currently fitted in series-production vehicles have a functional disadvantage however. Independently of the object, a signal corresponding to the radar backscatter cross-section is received without one being able to draw any conclusion regarding the physical dimensions and the type of the object. The value of the radar backscatter cross-section does not allow one to draw any conclusion regarding the type and target size either because this value is greatly dependent upon the viewing angle. The reliable classification of objects according to the categories lorry, car, motorbike/bicycle, pedestrian or false targets (manhole cover, bridge parapet etc.) for activation of the braking assistant is therefore unresolved. Another challenge is the functional improvement of current systems with regard to fading (multiple reflections and the resulting ghost targets) and the effect of spray caused by vehicles driving ahead or that are overtaking.

The previous radar devices for drive assistance systems use linearly polarised waves.

SUMMARY

An object of the present invention is to avoid the known disadvantages. Another object is the simplified, reliable and/or precise classification of objects by means of a polarimetric radar.

According to the application a polarimetric DBF (Digital Beam Forming) automotive radar is provided that, in addition to the range and speed information, can clearly detect and classify surface structures and the reflection focal points on the various objects in order to be able to determine the type and physical dimensions of the object. For this purpose a circularly polarised wave (either clockwise- or anticlockwise-rotating or alternately clockwise- and anticlockwise-rotating) is emitted and both the clock-wise- and anti-clockwise-rotating component of the wave reflected on the object is simultaneously received.

Therefore, a polarimetric radar is specified that consists at least of a transmission assembly that emits circularly polarised waves by means of transmission antennas and a receiver assembly that receives the reflected circularly polarised wave components by means of an antenna assembly, a plurality of two-channel receivers being provided as the receiver assembly which simultaneously receive clockwise- and anticlockwise-rotating circularly polarised signal components which are provided for digital beam shaping downstream of the antenna assembly. By evaluating the amplitude and the phase of the right- and left-circularly polarised signal components received and the relative distribution of the latter, one can thus draw conclusions regarding the structure of the detected objects, FIG. 11 showing the basic idea. For example, a left-circularly polarised wave is emitted. On the object the wave from the return beam centres is reflected back with an even number of total reflections as a left-circularly polarised wave. From the return beam centres with an odd number of total reflections the wave is reflected as a right-circularly polarised wave. If the frequency of the emitted wave is modulated with a correspondingly high frequency deviation (see FIG. 13), it is then possible to achieve a correspondingly high local resolution on the object and to clearly classify the object by means of the type of backscatter centres, i.e. the polarisation direction is changed or not.

Advantageously the transmission assembly consists in the horizontal and the vertical direction of a number of transmitters according to FIG. 1, the phase centre distances (ds) of which are chosen dependently upon the phase centre spacing of the individual antenna elements of the receiver (dz) such that by means of half-line transmission location changeover periodically recurring main lobes (so-called grating lobes) are suppressed by adding the signals of the real and the synthetic receivers according to FIG. 3. The suppression of the periodically recurring main lobes (so-called grating lobes) makes it possible here to precisely determine the angle of the detected objects. If it were possible to arrange the antenna lines at approximately the distance of half the wavelength of the transmission frequency, i.e. with 76 GHz approx. 2 mm, grating lobes would then not occur. This small distance would lead to over-couplings occurring between the antenna lines and sufficient decoupling between a co-polar and a cross-polar wave no longer being able to be achieved.

According to one advantageous configuration, each antenna element (or groups of antenna elements) of the reception antenna has a separate receiving channel for co-polar received signals relating to the transmitted signal and for cross-polar received signals relating to the transmitted signal in order to be able to execute beam steering in the vertical and in the horizontal direction.

Furthermore, the use of at least 4 transmission antennas enables half-line transmission location changeover in the vertical and in the horizontal direction. The aforementioned implementation of digital beam steering and half-line transmission location changeover makes it possible to determine precisely the angle of the detected objects during beam shaping and so beam steering both in the vertical and in the horizontal direction. With the advantageous configuration it is possible by digital beam shaping in azimuth and elevation to produce a two-dimensionally scanning radar.

According to one advantageous configuration, the receiver assembly has vertical receiving lines, the receiving network of which is designed such that the vertical receiving lines, which consist of the real component and the synthetic component generated by half-line transmission location changeover, have a low level of sub-lobes by means of amplitude superposition and amplitude multiplication factors of the synthetic lines according to FIG. 6. The vertical receiving network designed for a low level of vertical sub-lobes makes it possible to determine precisely the angles of the detected objects in the vertical direction.

According to one advantageous configuration, each transmission and reception antenna decouples right- and left-circularly polarised waves, preferably however with a common phase centre and preferably with an integral septum polarizer when using axially constructed corrugated horns according to FIG. 8. Sufficient decoupling of right- and left-circular waves is a prerequisite for the polarisation evaluation, a common phase centre clearly simplifying the complexity of the evaluation algorithm. The septum polarizer constitutes an advantageous embodiment if a hollow conductor horn antenna array is used. With planar antennas other embodiments are used.

According to one advantageous configuration, the distance between two phase centres of the individual reception antennas (dz) of the receiver assembly has a value which comes between the wavelength and 1.25 times the wavelength of the carrier frequency of the irradiated wave of the radar system. The geometric arrangement of the reception antennas thus guarantees an advantageous use of half-line transmission location changeover. Ideally, a distance between the real and the synthetic antenna line of half the wavelength is thus produced in relation to the transmission frequency.

According to one advantageous configuration, the transmission antenna has an aperture size compatible to half-line transmission location changeover, the 3 dB lobe width of which covers the scanning range of the radar receiver during the transmission process. Thus, the transmission antenna can be used for half-line transmission location changeover and the scanning range of the radar receiver can be used for the full scope of the target detection.

According to one advantageous configuration, the transmission assembly consists of 6 transmission antennas, preferably with two adjacent horizontally arranged transmission antennas which are vertically arranged in triplicate, adjacent transmission antennas being a distance ds apart which is (n−0.5) times the distance dz of the phase centre of the individual reception antennas and n is equal to a whole number. By means of the transmission assembly half-line transmission location changeover is made possible in the horizontal and in the vertical direction, when using vertical receiving lines the 3 vertical transmitters making a low vertical level of sub-lobes by means of the aforementioned design of the receiving network.

According to one advantageous configuration, each transmitter can emit, reversibly, both a left- and a right-circularly polarised wave according to FIG. 9, preferably for high decoupling of the polarisation directions using a septum polarizer when using an axially constructed corrugated horn according to FIG. 10. The ability of the transmitters to change over between the polarisation directions makes it possible to obtain additional information when evaluating the received signals. By a left- and then a right-circularly polarised wave being transmitted alternately, and the left- and the right-circularly polarised wave being received simultaneously, it becomes possible to establish the whole Müller matrix.

Advantageously the object classification, in particular using a polarimetric radar, takes place by a method that has the following steps:
 a) providing a transmission assembly that emits circularly polarised waves and a plurality of two-channel receivers as the receiver assembly which receive the reflected electromagnetic waves by means of an antenna assembly according to the principle of digital beam shaping, both the clockwise-rotating and the anticlockwise-rotating circularly polarised wave components being received simultaneously, and
 b) classification of the objects according to type and size by the position of the reflection focal points of the objects being determined by range and speed Fourier transforms both in the receiving channel for anticlockwise- and in the receiving channel for clockwise-rotating circularly polarised received signals.

By means of the aforementioned method, the object focal points which predominantly bring about polarisation rotation and the object focal points which predominantly do not bring about polarisation rotation, are recorded simultaneously in amplitude, relative speed, angle and polarisation property.

According to one advantageous configuration, in order to determine the position of the reflection focal points of the target objects of the co-polar received signals relating to the transmitted signal, and independently of this in order to determine the position of the reflection focal points of the target objects of the cross-polar received signals relating to the transmitted signal, a range and speed Fourier transform is respectively calculated and the spectrum is evaluated for the object classification (according to FIG. 12). By means of the aforementioned advantageous configuration of the method, the practical implementation is described for classifying the object focal points according to the property of a polarisation rotation or not.

According to one advantageous configuration, in order to determine the position of the reflection focal points of the target objects of the co-polar received signals relating to the transmitted signal with respect to the position of the reflection focal points of the target objects of the cross-polar received signals relating to the transmitted signal, a common range and speed Fourier transform is calculated and the spectrum for the object classification (according to FIG. 12) is evaluated. By means of the aforementioned advantageous configuration of the method, the practical implementation is described for determining the relative position of the object focal points with the property of a polarisation rotation with respect to those with no polarisation rotation.

Advantageously, the position of the reflection focal points of the target objects of the co-polar received signals relating to the transmitted signal with respect to the position of the reflection focal points of the target objects of the cross-polar received signals relating to the transmitted signal is determined by a method in which a range and speed Fourier transform is calculated by means of one of the two receiving channels in order to roughly determine the range gate of the relevant objects and then a high-resolution discrete range and speed Fourier transform is calculated for both receiving channels separately and for both receiving channels together by means of the respective range gate with the relevant objects and their spectra are evaluated for the object classification. By means of the aforementioned advantageous configuration of the method, a practical implementation with calculation time optimisation is described. Here, as a first step, the range gate with the position of the overall object is determined with the aid of a low-resolution FFT. Next, for this range gate a high-resolution DFT for the receiving channel for left-circular signals and in parallel for the receiving channel for right-circular signals and in parallel for both channels are calculated together in order to be able to classify the object.

According to one advantageous configuration the radar sensor according to the invention is integrated into a moving base, preferably of a car, preferably using the transmission frequency permitted for automotive applications in the frequency range of 76 GHz to 81 GHz, preferably by emitting a frequency-modulated continuous wave signal. The object according to the application is always used when the physical outlines of the object to be detected have to be recognised. In automotive applications these are vehicles and vehicle categories (car, lorry, motorbike, bicycle), people and false targets (bridge parapets, drains, crash barriers, etc.). In flight applications, e.g. when taxi-ing at an airport, these are other objects such as aircraft, supply vehicles, people and false targets such as e.g. positioning lights on the landing strip.

DETAILED DESCRIPTION

The polarimetric radar with digital beam shaping for object classification uses circular polarisation with the carrier frequency of 76 to 81 GHz permitted for automotive applications. Both the clockwise-rotating and the anticlockwise-rotating circular signal components which are reflected on the object are evaluated. Receiver-side digital beam shaping is used for the geometric angular resolution of the received data. This principle is applied in order to be able to calculate the complete radar image from one measurement for a fixed time. The disadvantage that the size of the individual radar backscatter cross-sections as e.g. in mechanically or electronically scanning systems is changed during the scan is thus avoided. This is a crucial advantage in order to be able to undertake a reliable polarimetric evaluation of the radar backscatter cross-sections of the object.

FIG. 1 shows the arrangement of the transmission and reception antenna units. In the horizontal direction the receiving unit consists of a number of receiving channels (Rx). Each receiving channel consists of individual emitters which are connected to one another vertically by a feed network. This arrangement enables digital beam shaping in the horizontal direction. By this principle the received data of the individual receiving channels which are detected at the same time are multiplied by an amplitude assignment in the subsequent digital signal processing, a phase component is applied to them and they are then added up so that the direction of the main lobe of the overall array can be swivelled. FIG. 2 shows the dependency between the swivel angle and phase components which can be added to the individual phases of the receiving channels. These are dependent, moreover, upon the distance between the receivers and the wavelength of the carrier frequency.

The permissible frequency range for automotive applications is between 76 GHz and 81 GHz, i.e. the wavelength is approx. 4 mm. In order to avoid "grating lobes", according to antenna theory the horizontal distance between receiving antennas should be half the wavelength of approx. 2 mm. In practice however it is not possible to arrange the receiving antennas so closely together. This gives rise to over-coupling, and the required isolation between the co-polars and cross-polars of at least 20 dB in order to be able to carry out the polarimetric target classification is lost. According to the application, by means of a greater distance between the receiving antennas, the creation of "grating lobes" by semi-line transmission location changeover can be avoided. With half-line transmission location changeover one transmits alternately with 2 spatially offset transmitters and one receives with the identical receiver array. The spatial offset of the transmitters is chosen here such that the receiving antennas thus lie virtually and centrally between the receiving antennas of the real receiving array. By adding the measurements with the first and the second transmitter when shaping the digital beam, the condition of the half wavelength between the reception antennas is fulfilled once again, and the creation of "grating lobes" is prevented.

As well as the receiving array, FIG. 1 also shows an arrangement of 6 transmission antennas. By using a number of transmitters which are spaced apart by a distance ds equal to (n−0.5)*dz, "ds" standing for the vertical and horizontal distances between the phase centres of the transmitters, and "dz" standing for the vertical and horizontal distances between the phase centres of the individual emitters of the receiver, and "n" being a natural smallest possible number, half-line transmission location changeover can be implemented by temporal transmission location changeover. FIG. 3 shows, as an example, this principle for 2 transmitters. The transmitters are used alternately, and the distance between the transmitters is imaged onto the receiving array so that a synthetic receiving array is produced that is shifted by the distance between the transmitter and the real receiving array. By means of the aforementioned correlation between the transmitter distances according to the formula, the synthetic receivers lie between the real receivers and one obtains halving of the receiver distances which should have approximately half the wavelength of the carrier frequency of the radar system in order to avoid disruptive "grating lobes" (periodically recurring main lobes) and to realise large swivel angles by means of digital beam shaping. If the parameter "n" becomes greater than 1 here, no distance halving takes place at the edge of the receiving array. Since these gaps at the edge of the antenna array cause secondary lobes, the corresponding channels are not taken into account for the digital beam shaping.

By means of half-line transmission location changeover the distances between the phase centres of the real reception antennas is doubled with the same performance. The space gained in this way is advantageous for the technical producibility of complex antennas. When forming the overall array the change to the phase when changing signal run times must be corrected by object movements relative to the radar sensor during the transmission process. So that half-line transmission location changeover can also be used for objects with smaller and average ranges, the transmitting and receiving unit must be arranged close to one another.

The multiple use of semi-line transmission location changeover in the horizontal and the vertical direction for the arrangement from FIG. 1 is shown by FIG. 4. For reasons relating to space the 6 transmitters have phase sensor spacing here which is 1.5 times the spacing of the phase centres of the individual reception antennas. In the receiving array gaps are therefore created on the edge of the array where no halving of the spacing of the receiving lines takes place. According to the above description the outer synthetic receiving line and the outer real receiving line are therefore not taken into account in the digital beam shaping. FIG. 5 shows the transfer of the transmission and reception assembly with 12 real receiving lines in one layout that shows the space required by the corrugated horn antennas used with circles. The distances for the transmitters and receivers are chosen here such that one can cover an angle range of approximately +/−45° by means of digital beam shaping. The number of e.g. 12 receiving lines leads to a 3 dB beam width of approx. 8°.

The feed network for a real receiving line which is constructed symmetrically must be designed here as regards hardware such that the assigned amplitude of the whole receiving line, that consists of the real and synthetic individual receiving antennas, guarantees high sub-lobe suppression. The synthetic individual reception antennas are produced by the real receiving line being shifted upwards and downwards by 1.5 times the spacing of the phase centres of the individual reception antennas by means of half-line transmission location changeover with 3 transmitters. Here the synthetic individual reception antennas are superposed in specific positions so that the corresponding assigned amplitude coefficients and multiplication factors are produced for the synthetic receiving lines which are shown in FIG. 6.

The reception antennas must receive the clockwise-rotating and the anticlockwise-rotating circularly polarised signal components simultaneously here. According to FIG. 7 two receiving channels are produced for one receiving line for both polarisation directions. The requirement here is for high decoupling between co- and cross-polar signal components. This is achieved by the corrugated horn emitter with a septum polarizer shown in FIG. 8. According to FIG. 5 the space requirement for a receiver is 4.2 mm. This value is approximately the wavelength of the carrier frequency of 76 to 77 GHz which is approx. 3.9 mm. The diameter of the aperture opening is designed to be 4.1 mm. According to the invention the septum polarizer has the property of a common phase centre for the receiving channel for the anticlockwise- and for the receiving channel for the clockwise-rotating circularly polarised received signals. This is a crucial prerequisite for the polarimetric object classification.

During the transmission process only an anticlockwise-rotating or a clockwise-rotating or a temporally alternately clockwise- or anticlockwise-rotating circularly polarised wave is emitted (FIG. 9). Here a corrugated horn emitter is once again suitable which, according to FIG. 10, has a space requirement of 6.3 mm and is designed for an aperture opening diameter of 6.1 mm. The size of the aperture opening must be chosen such that the main lobe of the transmitter covers the scanning range of the radar.

At the target object the polarisation is changed according to the surface structure of the object. Here larger target objects can be deconstructed into a number of individual targets, as e.g. shown in a greatly simplified manner in a vehicle in FIG. 11. The change in polarisation direction is determined here by the following properties of the object: angle of symmetry, orientation angle to the irradiating wave, number of reflections in the object and angle of polarisability. The latter is a measure for how strongly an object can polarise an unpolarised electromagnetic wave. As shown in FIG. 11, the properties of the reflection focal point decides whether, for example, a circularly anticlockwise-rotating wave at a reflection focal point on the object, that for example, shown in simplified form, only contains total reflections, is reflected as a circularly anticlockwise-rotating or circularly clockwise-rotating wave and is thus received. Since a circular wave changes the direction of rotation by total reflection, the following situation arises:
- reflection focal points of the object with an even number of total reflections do not bring about any change to the direction of rotation between the received and the transmitted signal, e.g. dihedral
- reflection focal points with an odd number of total reflections bring about a change to the direction of rotation between the received and the transmitted signal, e.g. corner reflector.

By means of the geometric representation of the object from reflection focal points with an even and an odd number of total reflections it is possible, for example, to determine the physical dimensions of the object and so the type or object category.

Another key aspect of the invention is the algorithm for determining the reflection focal points of the target. For this purpose the transmitting signal is frequency-modulated (FMCW) according to FIG. 13. According to the FMCW principle known from the literature, one then obtains in the received signal the so-called range gate according to the level of the frequency deviation of the transmitted signal and after calculation of the Fourier transform (range Fourier transform) with the following range resolution:

range resolution=light speed/(2 times frequency deviation)

and after another calculation of a fast Fourier transform (FFT) over a number of frequency ramps (Doppler FFT) the speed information for the objects in the individual range gates. According to FIG. 12 the range and speed FFT for the receiving channel are calculated here in parallel for the receiving channel for anticlockwise- and clockwise-rotating received signals, i.e. the reflection focal points with an even number of total reflections appear in the spectrum of the channel without polarisation rotation, and those with an uneven number of total reflections appear in the channel with polarisation rotation. From the spectrum the distance between equal polarisation focal points can then respectively be determined. In order to additionally be able to determine the distance between the rotating and non-rotating polarisation focal points, a common FFT of double the length is calculated over both channels. Here e.g. the values of the non-rotating channel are set on the real part of the input sequence of the FFT, and the values of the rotating channel are set on the imaginary part. The object is classified by evaluating the spectral components of the 3 spectra calculated by means of FFT.

Instead of calculating respectively a high-resolution FFT (anticlockwise-rotating and clockwise-rotating and sum channel), the following algorithm is also possible: The range and the speed FFT are calculated with low range resolution (small frequency deviation). If a possible object has then been identified in a range gate on the basis of the backscatter cross-section, for this specific range gate a high-resolution DFT (discrete Fourier transform) is then calculated in the rotating and in the non-rotating and in the sum channel by a new transmitting/receiving cycle taking place with a high frequency deviation. The object classification takes place as specified above.

DESCRIPTION OF THE FIGURES

The symbols indicate as follows here:
Rx: receiving channel
Tx: transmitter
ds: phase centre—transmitter spacing
dz: phase centre—individual reception antenna spacing
n: natural number (1, 2, 3, . . . )
Y: individual element antenna

The symbols indicate as follows here:
Y: receiver
α: phase components
d: distance between two receivers
θ: swivel angle
$\lambda_0$: wavelength

The symbols indicate as follows here:
Rx: real receivers
Rx_s: synthetic receiver
Tx: transmitter
dz: phase centre—individual reception antenna spacing
n: natural number (1, 2, 3, . . . )

Figure 1:
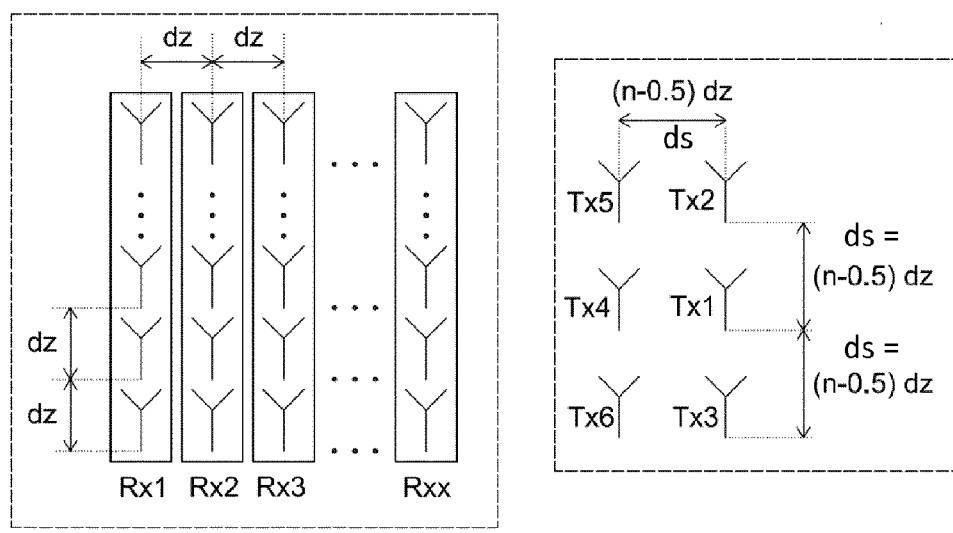
FIG. 1 shows the arrangement of the transmission and reception antenna unit. This consists of 6 transmitters which have spacing that is (n−0.5) times the spacing dz of the phase centre of the individual reception antennas, n being a natural number. 3 vertically arranged sensors are respectively located here at two horizontal positions. The receiving array is formed from a number of horizontally arranged receiving channels which consist of individual reception antennas in the vertical direction. The distances from the phase centres of all of the individual reception antennas correspond to the parameter dz.
Figure 2:
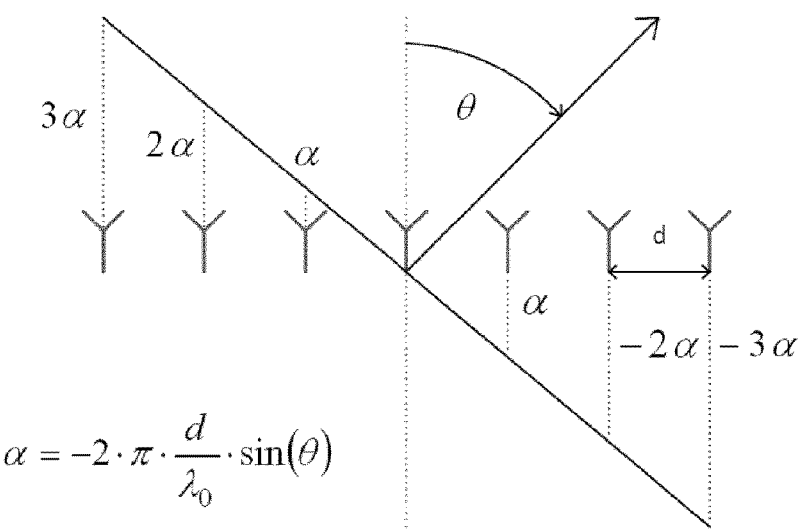
FIG. 2 shows the principle of digital beam shaping. Here, an additional phase component is applied to each receiver. The amount of this phase component is dependent upon the swivel angle, the geometric arrangement of the receiver, the distance between the receivers and the wavelength of the carrier frequency of the radar system.
Figure 3:
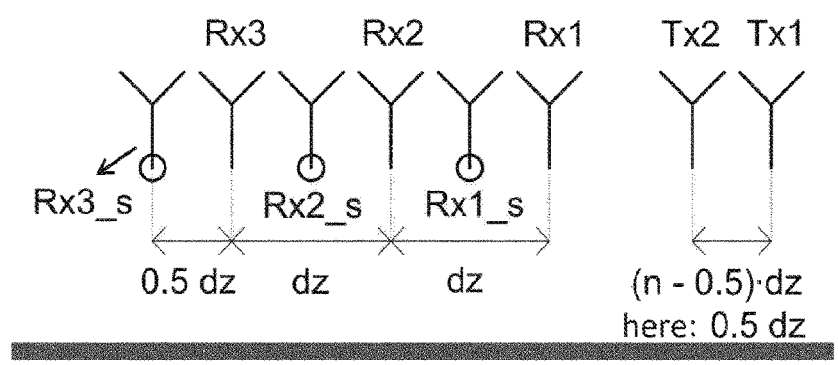
FIG. 3 shows the mode of operation of half-line transmission location changeover. Here two transmitters are arranged with spacing (n−0.5) times the spacing dz of the phase centre of the real individual receiving antennas, n being a natural number. On the receiver side a receiving array is thus created consisting of real and synthetic receivers, the latter being located between the real receivers, with the exception of the array edge.
Figure 4:
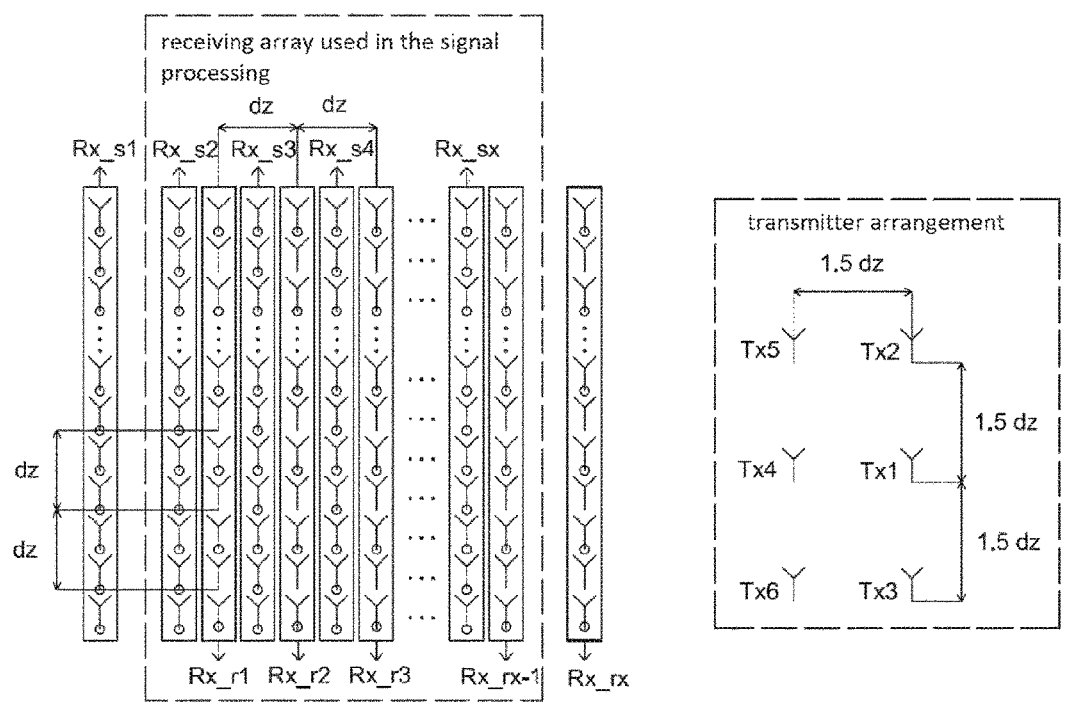

FIG. 4 shows the overall receiving array consisting of the real and the synthetic component and the associated 6 transmitters which having spacing 1.5 times the spacing dz of the phase centre of the real individual reception antennas. Here each real and synthetic individual antenna is shown symbolically, and the part of the receiving array used in the signal processing is encircled.

Figure 5:
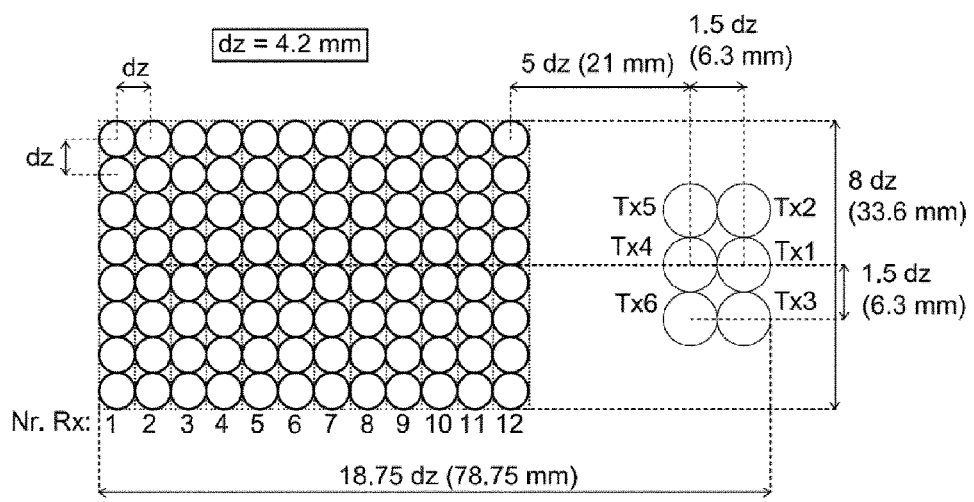

The symbols indicate as follows here:
Ỵ: synthetic individual antenna
Y: real individual antenna
Tx: transmitter
Rx: receiving line
dz: phase centre—individual reception antenna spacing FIG. 5 shows the transmitting and receiving unit from FIG. 4, the receiving array consisting of 12 receiving channels, and only the real individual antennas being shown, and indeed the space required by the latter when using corrugated horn antennas. The spacing of the phase centres of the individual antennas is specified as 4.2 mm. The resulting precise spacings for the transmitting and receiving unit are given in brackets in millimeters.

Figure 6:
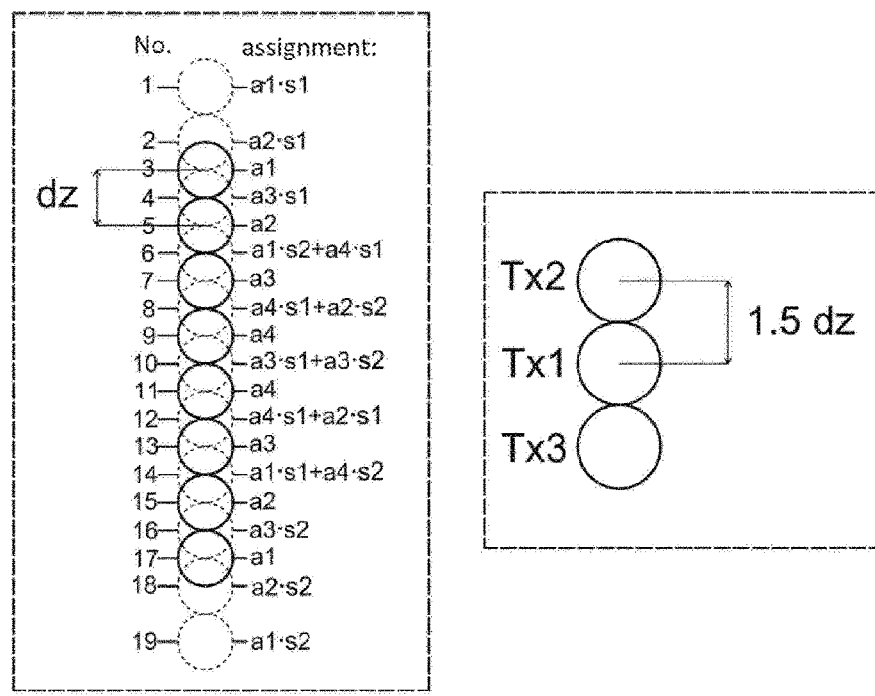

The symbols indicate as follows here:
O: space requirement for an individual antenna (corrugated horn antenna)
dz: phase centre—individual reception antenna spacing
Tx: transmitter
Rx: receiving line FIG. 6 shows the vertical assigned amplitude of a receiving line when using 3 vertical transmitters according to FIG. 5. Shown here are the space requirement of the real individual receiving antennas of a receiving line, the respectively shifted synthetic individual receiving antennas, the respective assigned amplitude coefficients of each individual receiving antenna, and additionally the multiplication factor for the synthetic antennas. The assigned amplitude of the real individual reception antennas is symmetrical here. The receiving line (on the left) consists of real and synthetic horn emitters. The transmitting unit consists of three vertical transmitters.

Figure 7:
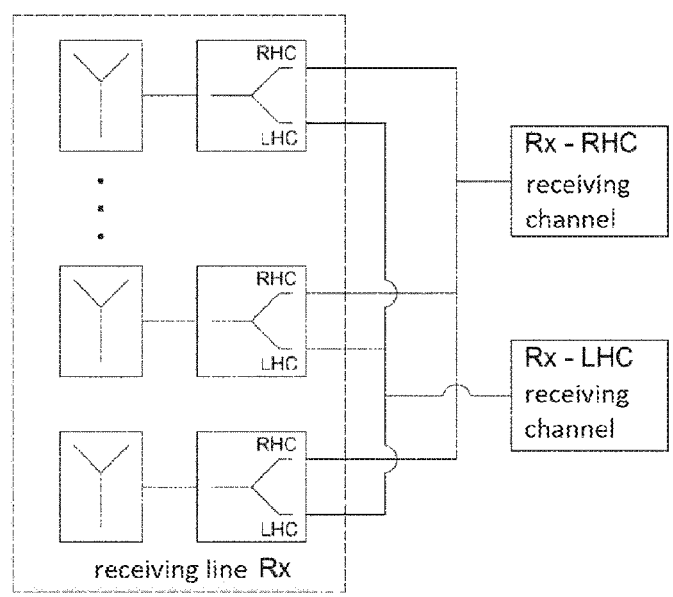

The symbols indicate as follows here:
Tx: transmitter
Rx: receiving line
dz: phase centre—individual reception antenna spacing
a: assigned amplitude coefficient of the individual reception antenna
s: multiplication factor of a synthetic receiving line
O: space requirement for a real individual antenna (corrugated horn antenna)
○: shifted synthetic individual receiving antenna FIG. 7 shows the receiving channel structure of a receiving line. For each individual antenna there is a receiving channel for right-circularly polarised signals and a receiving channel for left-circularly polarised signals. All of the receiving channels for right-circularly and for left-circularly polarised signals are connected to one another here.

Figure 8:
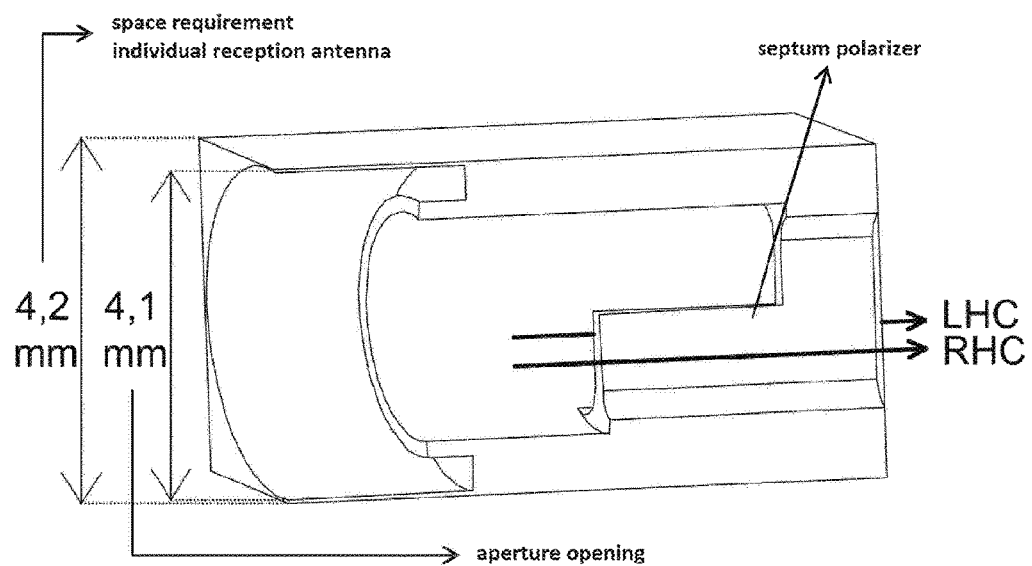

The symbols indicate as follows here:
RHC=right-circularly polarised
LHC=left-circularly polarised
Rx: receiving line FIG. 8 shows the cross-section of an individual receiving antenna. This is an axial corrugated horn emitter with an integral septum polarizer for a frequency of 76 to 81 GHz. The space requirement of the individual receiving antenna in the horizontal and the vertical direction is 4.2 mm. The aperture opening is specified as 4.1 mm.

Figure 9:
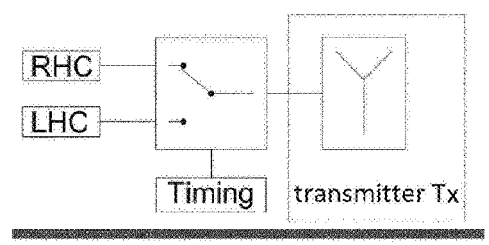

FIG. 9 shows the transmitting channel structure of a transmission antenna. The transmitter is fed with a right-circularly and a left-circularly polarised signal according to a temporal sequence.

Figure 10:
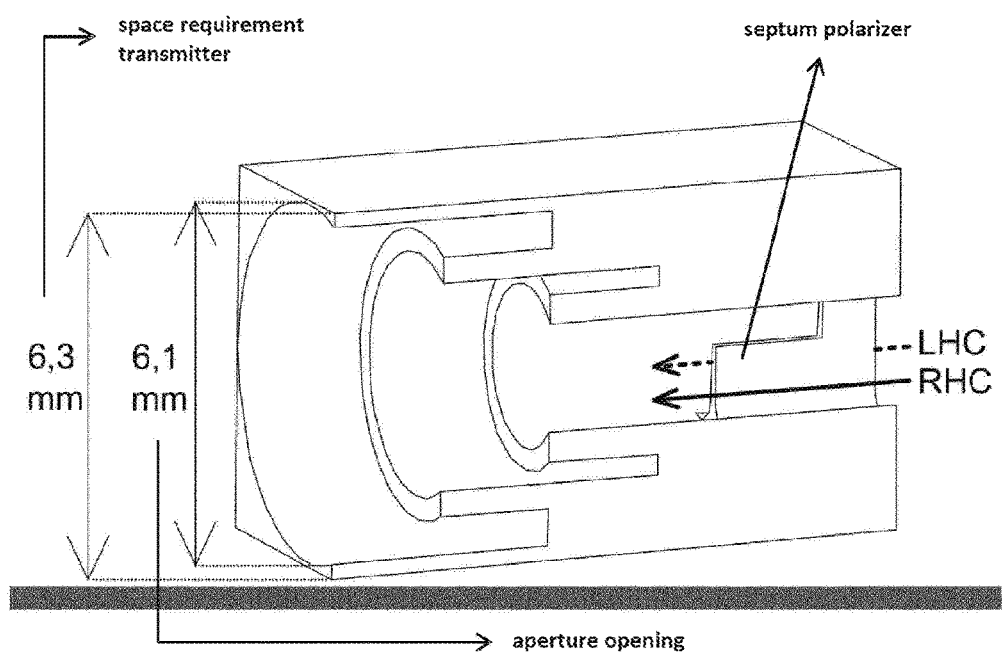

The symbols indicate as follows here:
RHC=right-circularly polarised
LHC=left-circularly polarised
Timing=temporal sequence of the switching process FIG. 10 shows the cross-section of a transmission antenna. This is an axial corrugated horn emitter with an integral septum polarizer for a frequency of 76 to 81 GHz. The space requirement of the transmission antenna is 6.3 mm in the horizontal and the vertical direction. The aperture opening is specified as 6.1 mm.

Figure 11:
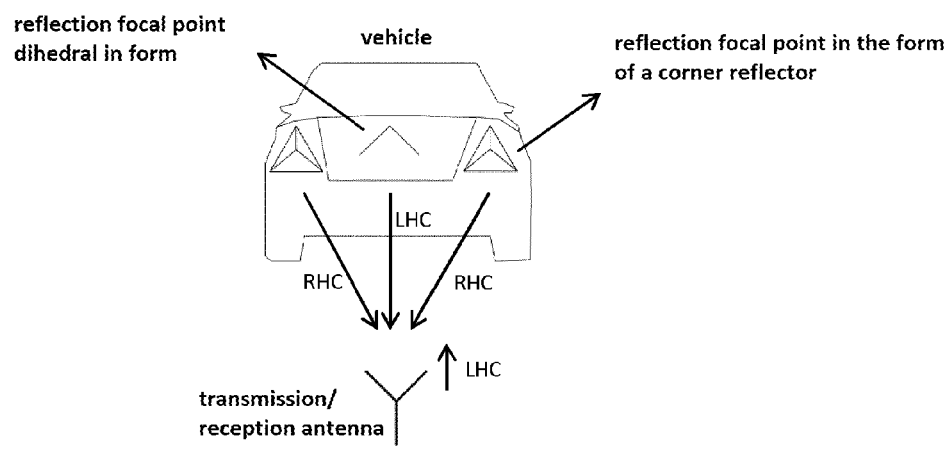

FIG. 11 shows, as an example, the reflection focal points on the vehicle and, with irradiation by an electromagnetic left-circularly polarised wave, their effect upon the polarisation direction of the wave. With a reflection focal point that is in the form of a corner reflector the polarisation direction rotates to the cross-polar, while a reflection focal point that is dihedral in form does not bring about any change to the polarisation direction.

Figure 12:
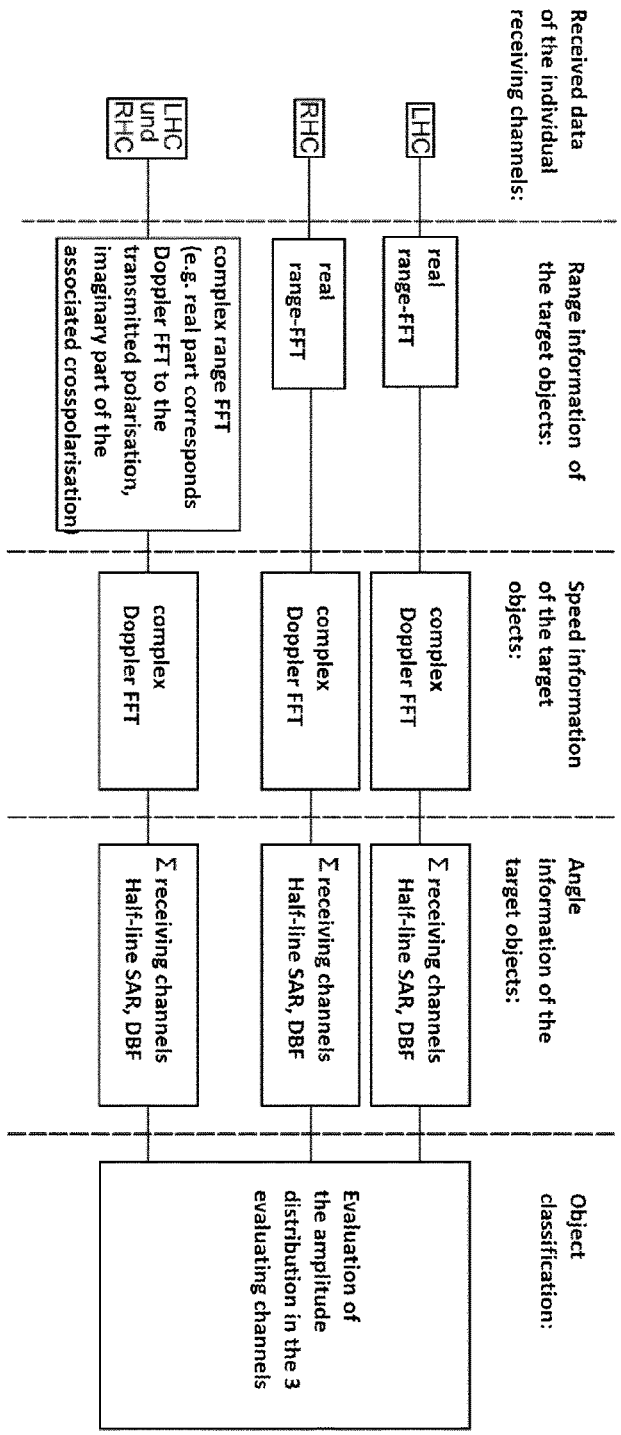

The symbols indicate as follows here:
RHC=right-circularly polarised
LHC=left-circularly polarised FIG. 12 shows the signal processing of the polarimetric radar. Here 3 signal processing algorithms running in parallel are shown which evaluate the data of the receiving channels for left- and right-circularly polarised signals individually and in combination. The range, speed, angle and object category identification information is obtained by means of the shown arrangement of real and complex Fourier transforms, weighted receiving channel additions and amplitude distribution evaluations according to the principles of half-line transmission location changeover and digital beam shaping.

Figure 13:
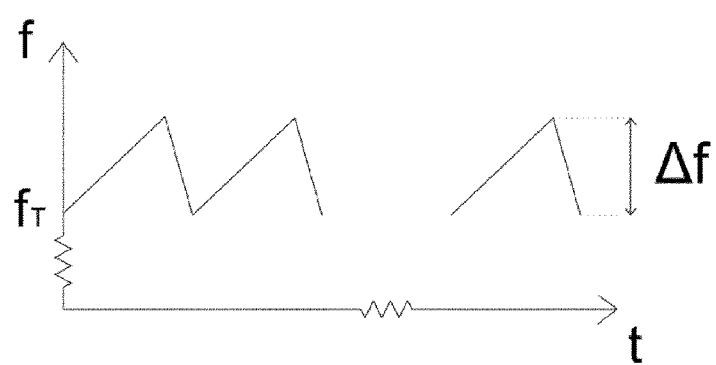

The symbols indicate as follows here:
RHC: right-circularly polarised
LHC: left-circularly polarised
FFT: Fourier transform
SAR: transmission location changeover
DBF: digital beam shaping/beam steering FIG. 13 shows the frequency modulation of the transmitted signal over time. The notions of carrier frequency and frequency deviation are implemented in the graph here.

The symbols indicate as follows here:
f: frequency
t: time
$f_T$: carrier frequency
$\Delta f$: frequency deviation

The invention claimed is:

1. A polarimetric radar, comprising:
a transmission assembly comprising transmission antennas that emits circularly polarized waves during operation of the polarimetric radar; and
a receiver assembly that receives reflected components of the circularly polarized wave using an antenna assembly during operation of the polarimetric radar,
wherein the receiver assembly comprises a plurality of two-channel receivers which, during operation, simultaneously receive clockwise- and anticlockwise-rotating circularly polarized signal components with a common phase center which are provided for digital beam shaping downstream of the antenna assembly.

2. The polarimetric radar according to claim 1, wherein the transmission assembly comprises a plurality of transmitters in a horizontal direction and a vertical direction, the plurality of transmitters having phase center distances which are chosen dependently upon the phase center spacing of individual antenna elements of the antenna assembly of the receiver assembly such that periodically recurring main lobes are suppressed.

3. The polarimetric radar according to claim 2, wherein for digital beam steering in the vertical and the horizontal direction each individual antenna element or groups of antenna elements of the antenna assembly of the receiver assembly has a separate receiving channel for co-polar received signals relating to the transmitted signal and for cross-polar received signals relating to the transmitted signal and half-line transmission location changeover is realized in both the vertical and in the horizontal direction by the use of at least 4 transmission antennas.

4. The polarimetric radar according to claim 2, wherein the receiver assembly has vertical receiving lines forming a receiving network designed such that the vertical receiving lines, which comprise a real component and a synthetic component generated by half-line transmission location changeover, have a low level of sub-lobes by means of amplitude superposition and amplitude multiplication factors of the synthetic lines.

5. The polarimetric radar according to claim 1, wherein each transmission and reception antenna decouples right- and left-circularly polarized waves.

6. The polarimetric radar according to claim 1, wherein the distance between two phase centers of individual antennas elements of the receiver assembly has a value between the wavelength and 1.25 times the wavelength of the carrier frequency of an irradiated wave of the radar system.

7. The polarimetric radar according to claim 1, wherein the transmission antennas have an aperture size compatible to half-line transmission location changeover, the lobe width of which covers the scanning range of the radar receiver during the transmission process.

8. The polarimetric radar according to claim 1 wherein the transmission assembly consists of 6 transmission antennas.

9. The polarimetric radar according to claim 1, wherein each of the transmitters emits during operation, reversibly, both a left- and a right-circularly polarized wave.

10. A method for object classification using a polarimetric radar according to claim 1, comprising:
a) providing a transmission assembly that emits circularly polarized electromagnetic waves and a plurality of two-channel receivers as the receiver assembly which receive reflected electromagnetic waves by means of an antenna assembly using digital beam shaping, both the clockwise-rotating and the anticlockwise-rotating circularly polarized wave components being received simultaneously and with a common phase center, and
b) classifying the objects according to type and size by the position of reflection focal points of the objects, the reflection focal points being determined by range and speed Fourier transforms both in the receiving channel for anticlockwise- and in the receiving channel for clockwise-rotating circularly polarized received signals by means of frequency modulation.

11. The method according to claim 10, wherein, in order to determine the position of the reflection focal points of the target objects of the co-polar received signals relating to the transmitted signal, and in order to determine the position of the reflection focal points of the target objects of the cross-polar received signals relating to the transmitted signal, a range and speed Fourier transform is respectively calculated and a spectrum is evaluated for the object classification.

12. The method according to claim 10, wherein, in order to determine the position of the reflection focal points of the target objects of the co-polar received signals relating to the transmitted signal with respect to the position of the reflection focal points of the target objects of the cross-polar received signals relating to the transmitted signal, a common range and speed Fourier transform is calculated and the spectrum for the object classification is evaluated.

13. The method according to claim 10, wherein in order to determine the position of the reflection focal points of the target objects of the co-polar received signals relating to the transmitted signal with respect to the position of the reflection focal points of the target objects of the cross-polar received signals relating to the transmitted signal, a range and speed Fourier transform is calculated by means of one of the two receiving channels in order to determine an approximate range gate of the relevant objects and then a high-resolution discrete range and speed Fourier transform is calculated for both receiving channels separately and for both receiving channels together by means of the respective range gate with the relevant objects and their spectra are evaluated for the object classification.

14. A method, comprising:
using the polarimetric radar according to claim 1 for object determination while integrated into a moving base.

15. The polarimetric radar of claim 5, wherein the antenna assembly comprises an axially constructed corrugated horn and the right- and left-circularly polarized waves are decoupled with a common phase center and with an integral septum polarizer when using the axially constructed corrugated horn.

16. The polarimetric radar of claim 7, wherein the half-line transmission location changeover has a lobe width of 3 dB.

17. The polarimetric radar of claim 8, wherein the transmission assembly comprises two adjacent horizontally arranged transmission antennas which are vertically arranged in triplicate, adjacent transmission antennas having spacing which is (n−0.5) times a spacing of the phase center of the individual receiver antennas and n is a whole number.

18. The polarimetric radar of claim 9, wherein the antenna assembly comprises an axially constructed corrugated horn and the right- and left-circularly polarized waves are decoupled with a common phase center and with an integral septum polarizer when using the axially constructed corrugated horn.

19. The method of claim 14, wherein the moving base is a car.

20. The method of claim 14, wherein the polarimetric radar is used with a transmission frequency permitted for automotive applications.

21. The method of claim 14, wherein the polarimetric radar is used with a transmission frequency in a frequency range of 76 GHz to 81 GHz.

22. The method of claim 14, wherein the polarimetric radar is used by emitting a frequency modulated continuous wave signal.

* * * * *